United States Patent
Gibson et al.

[11] Patent Number: 6,049,885
[45] Date of Patent: *Apr. 11, 2000

[54] METHOD AND APPARATUS FOR ALLOWING A REMOTE NODE TO AWAKEN A SLEEPING NODE OF A NETWORK

[75] Inventors: Glen Gibson, San Ramon; Thomas J. Runaldue, San Jose; Ching Yu, Santa Clara, all of Calif.

[73] Assignee: Advanced Micro Devices, Inc., Sunnyvale, Calif.

[*] Notice: This patent is subject to a terminal disclaimer.

[21] Appl. No.: 08/881,067

[22] Filed: Jun. 24, 1997

Related U.S. Application Data

[63] Continuation of application No. 08/326,691, Oct. 20, 1994, abandoned.

[51] Int. Cl.[7] .................................................. G06F 1/00
[52] U.S. Cl. ........................ 713/324; 713/100; 713/323; 709/223
[58] Field of Search .................................... 709/223, 200, 709/238, 220, 221; 713/323, 324, 100; 340/825.06, 825.07, 825.03; 371/2.2, 5.3, 6, 11.1, 12, 24; 380/3, 4

[56] References Cited

U.S. PATENT DOCUMENTS

| | | |
|---|---|---|
| 4,730,251 | 3/1988 | Aakre et al. ........................ 395/284 |
| 5,089,813 | 2/1992 | De Luca et al. .................... 340/825.44 |
| 5,196,728 | 3/1993 | Jaux ....................................... 307/10.1 |
| 5,305,321 | 4/1994 | Crayford . |
| 5,404,544 | 4/1995 | Crayford . |
| 5,465,926 | 11/1995 | Brown .................................. 246/34 B |
| 5,475,847 | 12/1995 | Ikeda ........................................ 395/750 |
| 5,485,625 | 1/1996 | Gumkowski ............................ 395/800 |
| 5,495,516 | 2/1996 | Lee et al. ..................................... 379/1 |
| 5,517,620 | 5/1996 | Hashimoto et al. ............... 395/200.72 |
| 5,530,808 | 6/1996 | Hammond et al. ................ 395/200.79 |
| 5,609,560 | 3/1997 | Ichikawa et al. ....................... 600/101 |
| 5,734,842 | 3/1998 | Leung ..................................... 395/284 |
| 5,835,719 | 11/1998 | Gibson et al. ..................... 395/200.51 |

*Primary Examiner*—Larry D. Donaghue
*Attorney, Agent, or Firm*—Fliesler, Dubb, Meyer & Lovejoy; Gideon Gimlan

[57] ABSTRACT

A system and method for remotely waking up a device connected to a local area network (LAN) is disclosed. A special data packet is disclosed wherein the destination address of the packet is embedded at least 16 consecutive times within the data field of the packet. When this particular type of packet is transmitted on the LAN, it is first decoded by the I/O subsystem of the device to determine whether or not it is a remote wake-up packet. After determining that the packet received is a remote wake-up packet, a wake-up enable line is activated thereby taking the system out of its low power mode, for providing further processing of future received packets.

39 Claims, 4 Drawing Sheets

METHOD AND APPARATUS FOR ALLOWING A REMOTE NODE TO AWAKEN A SLEEPING NODE OF A NETWORK

This application is a continuation of Ser. No. 08/326,691, filed Oct. 20, 1994, now abandoned.

BACKGROUND OF INVENTION

1. Field of the Invention

This invention relates generally to local area networks (LAN's), and more particularly to the remote wake-up of components connected to a local area network.

2. Description of the Related Art

Communication between multiple users across vast distances via a network has become almost a necessity in today's global marketplace. A Local Area Network (LAN) is a specific type of network which can support peer-to-peer communication over distances of tens of meters to several kilometers. A specific type of LAN is the ethernet, where information from multiple users travels through the network by use of a system bus in the form of discrete packets containing a number of pieces of information. A typical information packet contains a series of fields: a Destination Address Field; a Source Address Field; a Length Field; a Data Field where the user information is present and, in some cases, an error checking field.

Presently, there is a trend, due to the increasing use of lap top and other portable computers which operate on battery power for manufacturers to develop systems that have power conservation features or that can operate in a low power mode. Due to the increasing consumer demand for low power operation capability, the ability to wake-up a remote device in the SLEEP (low power) mode without the use of the Managed Processing Unit (CPU) or other Power Management circuitry which requires a lot of power and decreases battery life is becoming increasingly important to manufacturers. For a device that is in a low power mode, there is no simple and efficient way to determine how information packets that are received by the device through the network should be processed. In present systems, the CPU would have to be activated to process the incoming information to see if the entire device should be activated. This requires the use of a lot of extra hardware which uses a lot of energy which, in turn, means a shorter battery life. Also, if there is a mistake in the Destination Address, the information packet sent may be received by a subsystem, i.e. input/output (I/O) interface, that should not receive the information packet.

Thus, the ability to be able to wake-up a device in the low power mode and to transmit and process information quickly and accurately which is transmitted through a LAN is of importance to both manufacturers and consumers alike.

SUMMARY OF THE INVENTION

The present invention solves the aforementioned and related problems of remotely waking up a device in a low power mode forming part of a node of a network and further processing and transmitting information sent via a LAN to the correct node or device. Disclosed herein are a special information packet structure and I/O device used for listening for the special information packet. Once the special information packet is received, the CPU will be activated and further received data will be sent to the awakened device for further processing, if any. If the special information packet received by the I/O device is not intended to be sent to the particular node that is listening for the information, the data will not be further processed by that particular node.

An object of the present invention is to be able to remotely wake-up a device coupled to a local area network when there is information to be processed by that particular device in the low power mode.

Another object of the present invention is to be able to transmit information to various users along the network without the use of the central processing unit.

An advantage of the present invention is that the same input/output device present in a standard personal computer can be used.

Another advantage of the present invention is that it can be implemented with very few parts.

Still a further advantage of the present invention is that it uses the same packet structure present in prior systems.

BRIEF DESCRIPTION OF THE DRAWINGS

These and other objects, advantages and features of the present invention will become apparent from the following description, taken in conjunction with the accompanying drawings, in which.

DESCRIPTION OF THE PREFERRED EMBODIMENT

Figure 1:
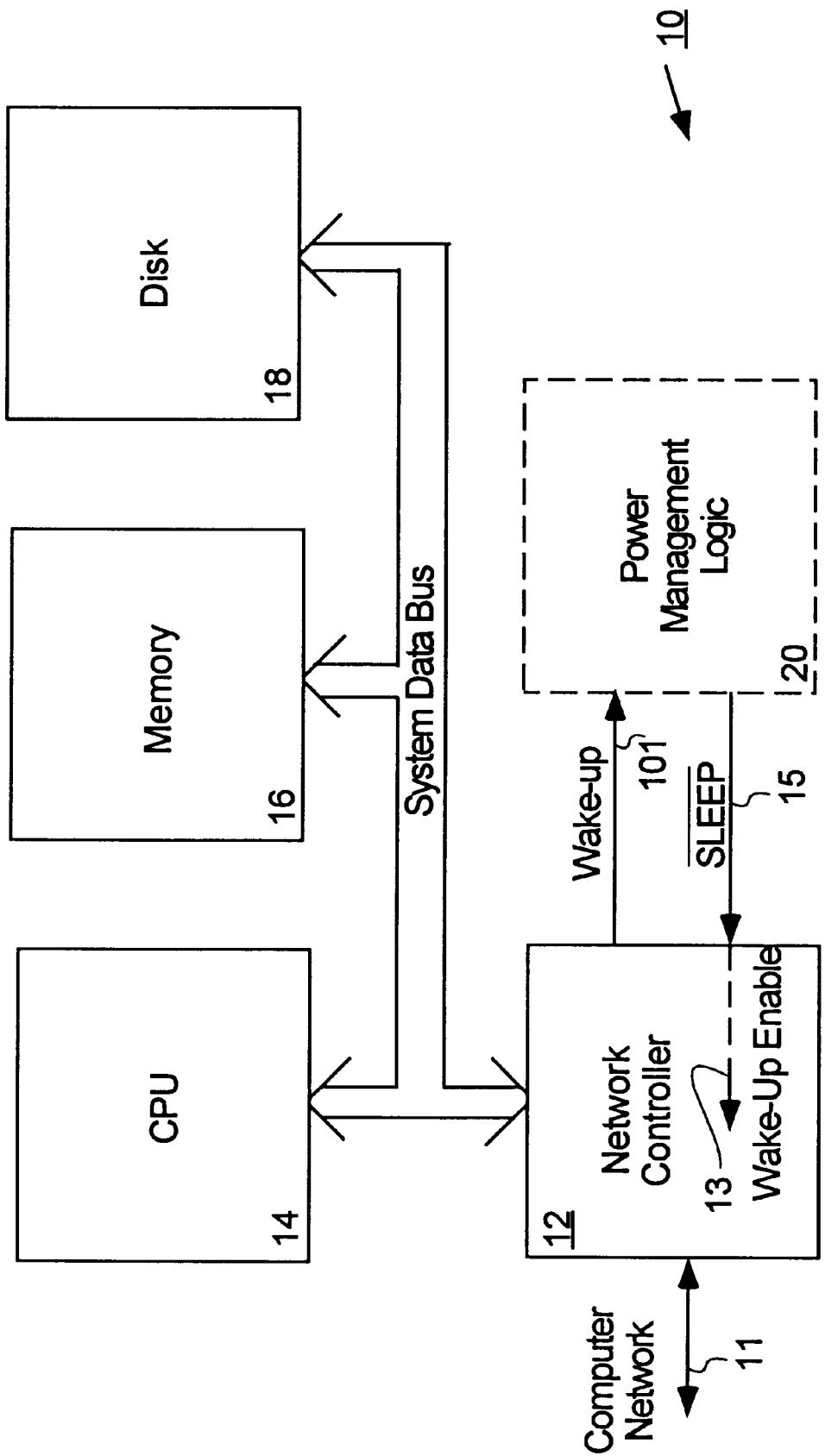
FIG. 1 is a block diagram of a personal computer system with low power operation capability that is connected to a network for remote wake-up.

A description of the information packet and the hardware which functions to generate a signal to wake-up a device in sleep mode via a local area network, will now be described with reference to FIGS. 1–4. FIG. 1 shows a block diagram of a digital device having remote wake-up capability. The device, in a preferred embodiment, is described as a power-managed personal computer system forming part of one node of a local area network (LAN) having a plurality of additional nodes with similar power-managed devices forming parts of those additional nodes. The components that make up the remote wake-up section of the Network Controller as set out in greater detail in FIGS. 3 and 4 below, are placed on a single integrated circuit (IC) chip. However, other levels of integration are possible. For example, the Network Controller and the Power Management Logic may be placed on an IC chip. Also, all of the components that make up the device may be placed on a single IC chip or a series of chips. Further, it will be known to those of ordinary skill in the art that the personal computer system represented here can be a more complex system.

In the preferred embodiment, the personal computer system 10 is connected to form part of one node of the computer network, which in this case is the ethernet, via line 11. The ethernet is coupled to the network controller 12, which in turn is coupled to the Central Processing Unit (CPU) 14, Memory Unit 16, and Disk 18 of the personal computer system 10 via the system data bus. The network controller 12, which is located within the input/output (I/O) subsystem of the personal computer system 10 is also coupled to a Power Management Logic Block 20 via wake-up line 101 and an active low sleep line (SLEEP) 15. The Power Management Logic Block 20 is coupled to the CPU 14 for providing power conservation capability to the personal computer system 10. The powering down of the components of a personal computer system 10 is known to those of ordinary skill in the art and will not be discussed further herein.

Figure 2:
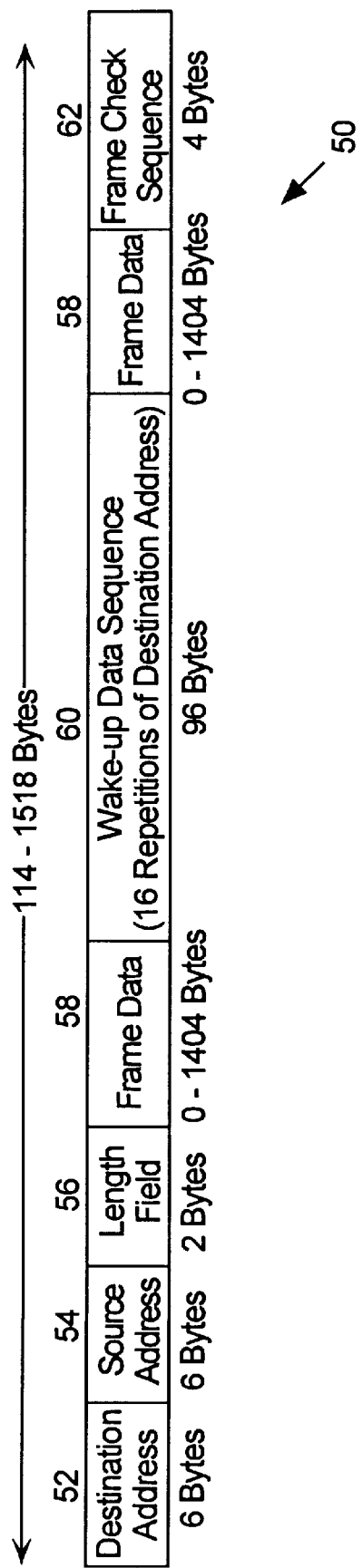
FIG. 2 is a schematic view of the remote wake-up packet format of the present invention.

The structure of the information packet 50 which is transmitted through the ethernet and contains the remote wake-up information of the present invention is shown in FIG. 2. The information packet 50 that is transmitted through the ethernet is generated by a source node remote from the personal computer system 10 by a combination of software and hardware similar to that discussed above. It is understood that any node of a network can act as a source node for transmitting information to the other nodes of the network. The personal computer system 10 of the present invention in conjunction with the appropriate software and hardware (not shown) can act as a source node and transmit information to the plurality of other nodes coupled to the network. The information packet 50 is partitioned into 6 different fields. The first field contains the 6-byte Destination Address 52 indicating where the information packet 50 is to be sent. The second field contains a 6-byte Source Address 54 indicating where the information packet 50 originated from. The third field is a 2-byte length field 56 which contains the length of the frame data within the information packet 50. The fourth field is the Frame Data block 58 which may vary from 0 to 1404 bytes in length containing the data to be processed. In the preferred embodiment of the present invention a 96 byte wake-up data sequence 60, comprising 16 consecutive repetitions of the Destination Address 52 is embedded within the Frame Data block 58. The wake-up data sequence can be located anywhere within the Frame Data block 58. Finally, the sixth field contains a 4-byte Cyclic Redundancy Check (CRC) error control code 62 for checking the accuracy and reliability of the data 58 that was transferred by the information block 50. The total length of the information packet 50 of the present invention may vary from 114 to 1518 bytes. The functions of the particular information packet 50 discussed above will be described in greater detail below.

Figure 3:
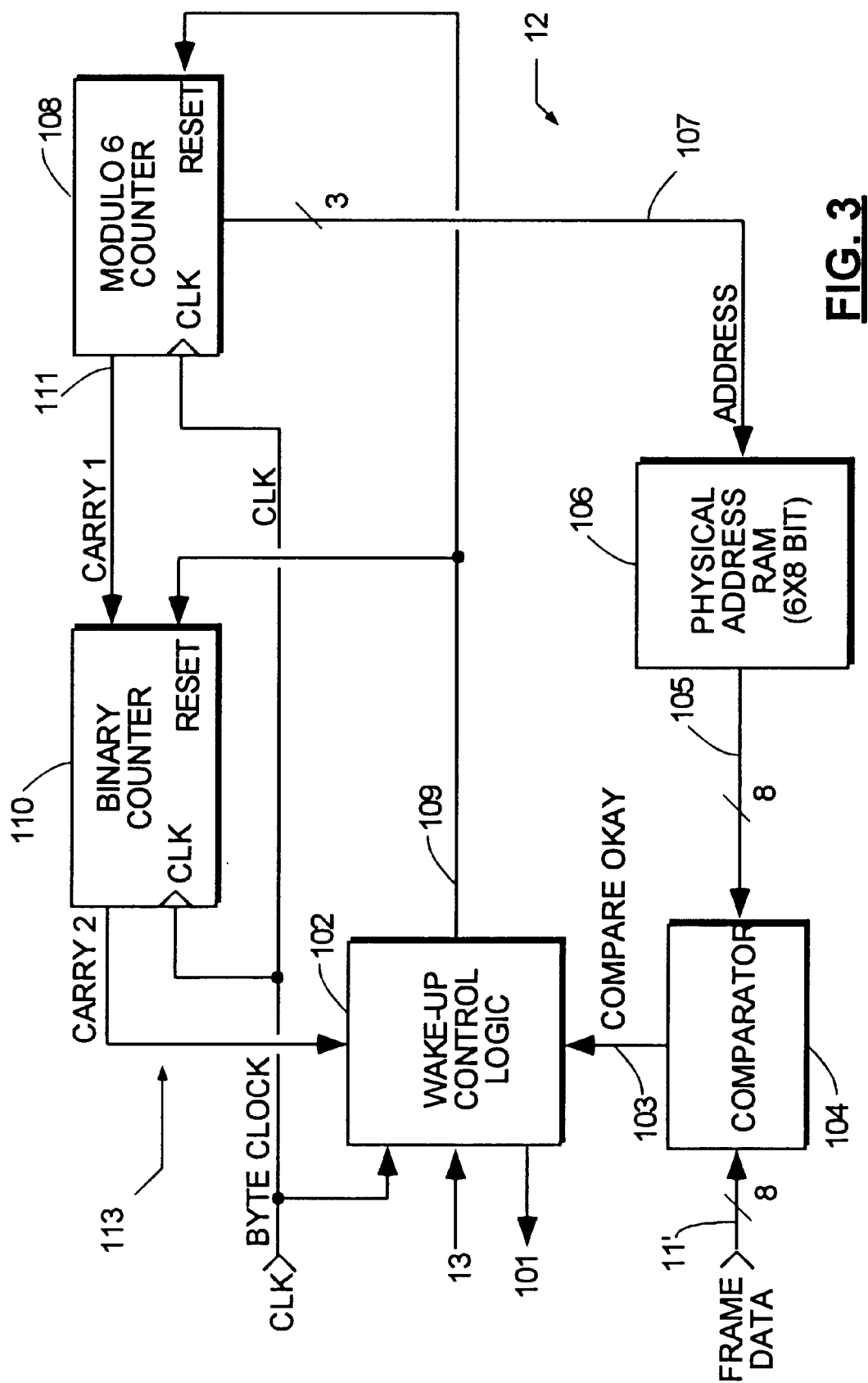
FIG. 3 is a block diagram of the remote wake-up section of the network controller of the present invention.

FIG. 3 illustrates in greater detail, the components which comprise the remote wake-up section of the network controller 12 of the present invention. Data from the information packet 50 transmitted through the ethernet 11 is sent to a comparator 104 via line 11'. The comparator 104 is also coupled to a 48 bit Physical Address RAM 106 that is separated into six (6) 8-bit registers, containing the address of the personal computer system 10, via line 105. The output of the comparator 104 is transmitted to the wake-up control logic block 102 via compare okay line 103. The other inputs to the wake-up control logic block 102 are the wake-up enable line 13 which is transmitted from inside the network controller 12, a byte clock signal on line CLK and the carry 2 output line from the binary counter 110 via line 113. The wake-up control logic 102 is further coupled to the RESET pin of the binary counter 110 and a modulo 6 counter 108 via line 109. Three outputs of the modulo 6 counter 108 are transmitted to the Physical Address RAM 106 via line 107. The other output of the modulo 6 counter, the carry 1 output, is transmitted to the binary counter 110 via line 111. The function of the network controller 12 will be described in greater detail below.

Figure 4:
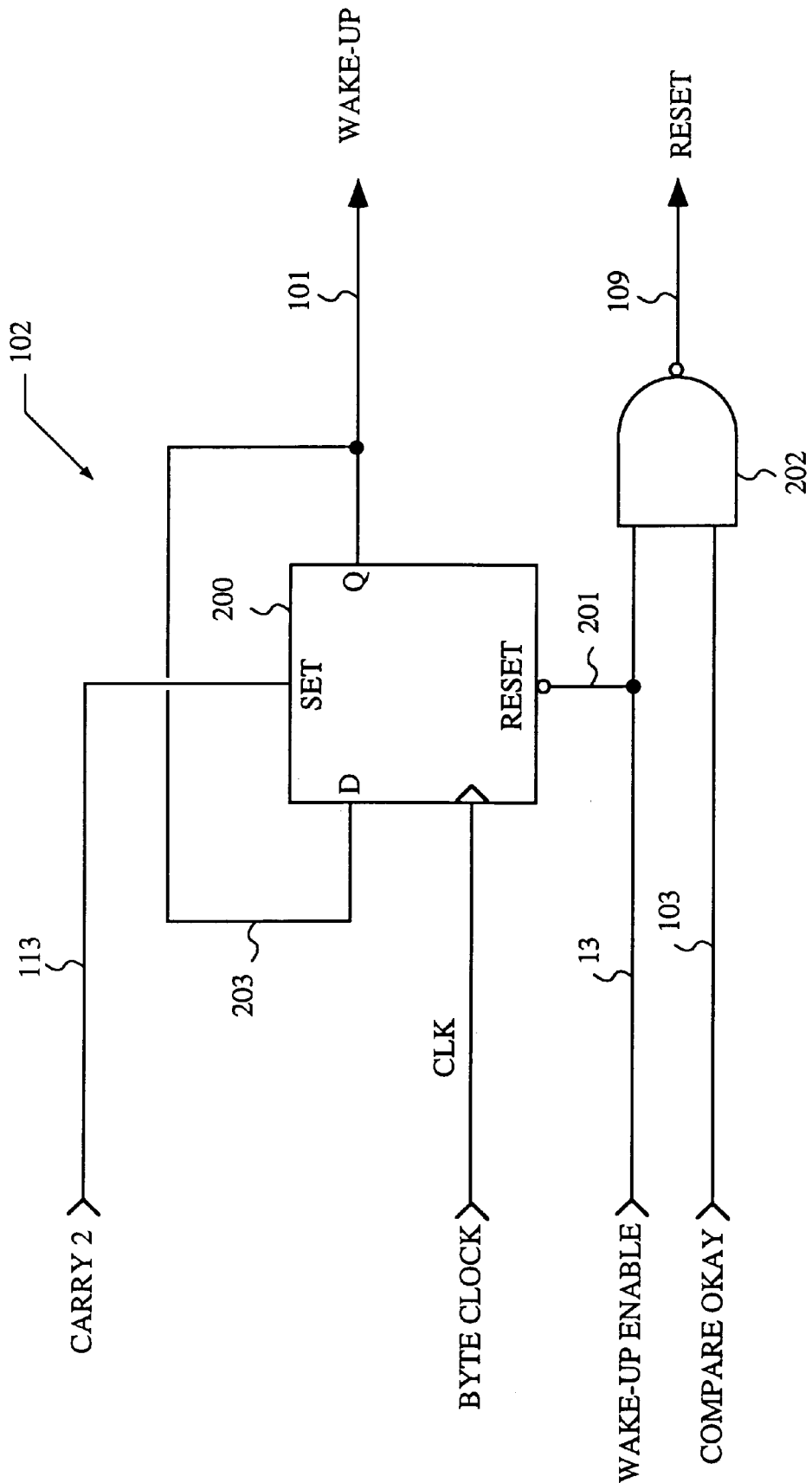
FIG. 4 is a block diagram of the wake-up control logic of the network controller of the present invention.

FIG. 4 illustrates a schematic diagram of the wake-up control logic 102 of the present invention.

The carry 2 output line of the binary counter 110 is transmitted to the SET pin of the D flip flop ("flip flop") 200 via line 113. The byte clock CLK signal is transmitted to the clock input of the flip flop 200. The wake-up enable line 13 is transmitted to both the active low RESET pin 201 of the flip flop 200 and to one input to NAND gate 202. The second input to the NAND gate 202 is the compare okay line from the comparator 104 on line 103. The output of the NAND gate 202 is fed into both the RESET pin of the modulo 6 counter 108 and the RESET pin of the binary counter 110 via line 109. The output of the flip flop 200 is fed back into its input via line 203 and further acts as the wake-up frame received output line 101 of the system. The function of the wake-up logic 102 will be discussed in greater detail below.

The operation of the wake-up control logic 102 to generate the signal which powers up the personal computer system 10 of the present invention will now in be described with reference to FIGS. 3 and 4. The personal computer system 10 must be in a low power (sleep) mode before any wake-up capability is available. Thus, the Power Management Logic Unit 20 puts the personal computer system 10 into the low power mode by asserting the SLEEP line 15 to an active low (OV) state. When the SLEEP line 15 is active low, the wake-up enable line 13 is made active high, thereby placing the network controller 12 into the remote wake-up mode. When the network controller 12 is in the remote wake-up mode, it listens to the ethernet via line 11 for any information packets 50 that are being transmitted through the ethernet via line 11. When an information packet 50 reaches the personal computer system 10, it is first transmitted to the comparator 104 via line 11 where the Destination Address 52 of the information packet 50 is compared to the output of the Physical Address RAM 106 which has been loaded with the node address of the personal computer system 10 on line 105 to determine if the particular Destination Address 52 is connected to the node serviced by the particular network controller 12. If there is an address match, the compare okay line 103 is asserted active high and transmitted to the wake-up control logic block 102 via line 103. As long as there is an address match, the compare okay line 103 will remain active high. The wake-up enable line 13 is asserted via the SLEEP line 15. The wake-up enable line 13 is also used as a remote wake-up acknowledgement when the SLEEP line 15 is deasserted. After the comparator 104 receives the Destination Address 52 contained within the information packet 50, the Frame Data field 58 of the packet 50 is read to determine if the Destination Address 52 is present at least 16 consecutive times within the frame data 58 of the information packet 50. For each consecutive byte of received data, the byte clock line is toggled via line CLK incrementing the modulo 6 counter 108. When the modulo 6 counter 108 counts six transitions of the byte clock on line CLK the carry 1 output becomes active high and is transmitted to the binary counter 110 via line 111. The binary counter 110 continues to increment in synchronism with the byte clock on line CLK until it reaches 16. At this point, the carry 2 line 113 becomes active high and is transmitted to the SET pin of the flip flop 200 of the wake-up control logic 102. When the count of the binary counter 110 reaches 16, this signifies that the frame data 58 of the information packet 50 needs to be processed by the CPU 14 of the personal computer system 10. The asserted carry 2 line 113 that is transmitted to the SET pin of the flip-flop 200, results in a wake-up signal on line 101 that is transmitted to the Power Management Logic 20 which indicates that the CPU 14 should be activated. After the Power Management Logic 20 has acknowledged the wake-up signal on line 101, the SLEEP line 15 is deasserted which deasserts the wake-up enable line 13. The compare okay line 103 is also made active low, thereby causing the output of the NAND gate 202 on line 109 to become active high thus resetting the modulo 6 counter 108 and the binary counter 110 to zero.

Once the frame data 58 has been transmitted from the network controller 12 to the CPU 14 of the personal computer system 10, the personal computer system 10 will stay in the active state while there is processing being done on the frame data 58 that is read from future information packets 50 received by the network controller 12. Once the processing of the frame data 58 is complete, and after a predetermined time of inactivity, the Power Management Logic 20 will again power down the personal computer system 10 by making the $\overline{\text{SLEEP}}$ line 15 active low which will assert the wake-up enable line 13, thereby putting the personal computer system 10 back in the remote wake-up mode to listen for another information packet 50.

The foregoing description of the preferred embodiment of the present invention has been presented for purposes of illustration and description. It is not intended to be exhaustive or to limit the invention to the precise form disclosed, and obviously many modifications and variations are possible in light of the above teaching. The system and method described for the remote wake-up of a personal computer system was chosen and described in order to best explain the principles of the invention and its practical application to thereby enable others skilled in the art to best utilize the invention in various embodiments and with various modifications as are suited to the particular use contemplated. For example, the personal computer system may be placed in the sleep mode via software control. It is intended that the scope of the invention be defined by the claims appended hereto.

What is claimed is:

1. An awakenable system for use within a uniquely addressable node of a network, said network having a plurality of nodes, the awakenable system comprising:
   (a) a device configurable to operate in a sleep mode;
   (b) a memory coupled to said device; and
   (c) a controller for coupling to said network by way of the uniquely addressable node and thereby receiving information packets from the network, where said node has a unique physical address and said controller includes:
      (c.1) detecting circuitry operative to detect a wake-up data sequence within an information packet received by the controller from said network, said information packet containing an address portion and a data portion, where the wake-up data sequence is constituted at least by said unique physical address repeated N consecutive times within said data portion of said information packet, where N is an integer greater than one; and
      (c.2) control circuitry, coupled to said detecting circuitry, for generating a wake-up control signal to awaken said device in response to said detecting circuitry detecting the wake-up data sequence.

2. The system of claim 1, wherein said detecting circuitry includes a counter operatively coupled to count how many times said unique physical address repeats consecutively within said data portion.

3. The system of claim 1, wherein said control circuitry comprises acknowledgment circuitry operative to maintain said wake-up control signal until assertion of the wake-up control signal is acknowledged by another circuit.

4. The system of claim 1, wherein said address portion of said information packet comprises a destination address portion and a source address portion.

5. The method of claim 1, wherein said device is powered by a battery.

6. The system of claim 1, wherein the value of N equals at least 16.

7. The method of claim 1, wherein said information packet further includes a length portion and an error correction portion.

8. In a communications system having a plurality of interlinked, uniquely-addressed nodes, wherein at least one of said nodes includes an awakenable device configured to operate in a sleep mode, a method for waking such an awakenable device from the sleep mode, said waking method comprising the steps of:
   (a) receiving at a given node having such an awakenable device, an information packet sent over said communications system, said information packet containing an address field and a data field;
   (b) determining at the given node whether an address sequence corresponding to a unique address of the given node occurs at least N consecutive times within said data field of said received information packet, where N is an integer greater than one; and
   (c) generating a control signal to wake said device of the given node in response to said determining step finding said N consecutive occurrences of said address sequence.

9. The method of claim 8 wherein step (b) of determining comprises the step of:
   (b1) incrementing a counter for each consecutive occurrence of said address sequence in said data field of said information packet.

10. The method of claim 8, wherein N equals at least 16.

11. The method of claim 8, wherein said awakenable device is powered by a battery.

12. The method of claim 8, wherein said corresponding address sequence includes the unique physical address of said at least one node that contains the awakenable device.

13. The method of claim 8, further including the step of;
   (d) after the awakenable device is awakened, processing further information contained within received information packets.

14. The method of claim 8, wherein if said address sequence does not occur at least N consecutive times, said awakenable device is not awakened.

15. An integrated circuit for switching an asleep node of a network to an awakened state, said integrated circuit comprising:
   a controller coupled to access frame data received by said node, and to further access a unique physical address of said node, where the node has circuitry disposed therein to monitor said network for information packets addressed to said node while the node is in the asleep mode, said information packets including a destination address area and a frame data area;
   said controller including detection circuitry for detecting within the accessed frame data, consecutively repeated occurrences of a subsequence corresponding to the unique physical address of said node;
   wherein upon detecting the occurrence of said subsequence repeated at least 16 consecutive times within the accessed frame data, said controller generates a wake-up signal for initiating the switching of said node to the awakened state.

16. The integrated circuit of claim 15, wherein said detection circuitry includes a counter for counting the number of consecutively repeated occurrences of said subsequence.

17. The integrated circuit of claim 15, wherein said node includes a device that switches from a power-conserving mode to a higher-power mode in response to said controller generating the wake-up signal.

18. A system comprising a network having a plurality of nodes including an awakenable node that can be placed into a sleep mode, wherein the awakenable node has a unique physical address and comprises:

a switchable device that can be switched between a low power mode and a comparably higher power mode;

network interface means for receiving information packets transmitted over said network, said information packets having an address field and a frame data field;

power management circuitry for switching said device from the low power mode to the higher power mode in response to a wake-up signal; and a controller including control circuitry responsive to frame data provided in received ones of said information packets, said controller generating said wake-up signal in response to receipt of an information packet containing a wake-up command, said wake-up command including at least 16 consecutive repetitions of a subsequence corresponding to said unique physical address of said awakenable node within said frame data field of said information packet.

19. The system of claim 18, wherein said control circuitry comprises a counter for counting the number of consecutively repeated occurrences of said subsequence.

20. The system of claim 18, wherein the address field of said information packet comprises a destination address field and a source address field.

21. The system of claim 18, wherein said information packets further include a length field and an error checking field.

22. The system of claim 18, wherein said switchable device is powered by a battery.

23. The system of claim 18, wherein said switchable device is contained within a portable computer.

24. A system for allowing awakening of a sleeping portion of an addressable first node belonging to a network of uniquely addressable nodes, wherein said addressable first node of the system has a unique address and comprises:

a packet receiver capable of receiving information packets transmitted over the network from other nodes, each packet including a destination address field and a data field;

a sequence recognizer coupled to the packet receiver, for recognizing the presence within the data field of each received packet, of a consecutive repetition of an address subsequence corresponding to the unique address of the first node; and an awakening mechanism, responsively coupled to the sequence recognizer, for initiating awakening of the sleeping portion of the addressable first node in response to the sequence recognizer recognizing the presence within the data field of the received information packets, of the consecutive repetition of the address subsequence.

25. The system of claim 24, wherein the unique address of the first node is a physical address of the first node.

26. The system of claim 24, wherein the sleeping portion of the addressable first node is powered by a battery.

27. The system of claim 24, wherein the sleeping portion of the addressable first node is at least partially contained within a portable computer.

28. In a data exchange system having a plurality of individual nodes coupled to one another through a transmission medium, wherein at least one of the nodes is a switchable node that includes a corresponding device which can be placed in a first mode of operation and thereafter switched to a second mode of operation, a method of remotely switching the device from the first mode of operation to the second mode of operation, said remote switching method comprising the steps of:

(a) receiving at a given, switchable node, one or more information packets each having a frame data block containing sequential data, where the sequential data has been transferred through said transmission medium, and where the received one or more information packets each includes a destination field containing a destination address referencing the switchable node;

(b) recovering the sequential data contained in the received one or more information packets;

(c) determining if the device is in said first mode of operation;

(d) determining whether a unique subsequence repeats at least N consecutive times within said recovered sequential data, where N is an integer greater than one, and where the unique subsequence corresponds to the node-referencing destination address; and (e) initiating a switching of said device to the second mode of operation in response to a finding by said determining steps that the device is in said first mode of operation and there are N consecutive repetitions of said unique subsequence in said recovered sequential data.

29. A remote switching method according to claim 28 wherein said device consumes a first amount of power when in the first mode of operation and said device consumes a greater, second amount of power when in the second mode of operation.

30. A remote switching method according to claim 28 wherein said corresponding device includes at least one of a central processing unit (CPU), a memory unit, and a disk unit where said at least one unit is placed in a power-conserving mode when said corresponding device is placed in the first mode of operation and said at least one unit is placed in a higher power mode when said device is switched to the second mode of operation.

31. In a data exchange system having a plurality of individual nodes coupled to one another through a transmission medium, wherein at least one of the nodes is a switchable node that includes a corresponding device which can be placed in a first mode of operation and thereafter switched to a second mode of operation, a method of remotely switching the device from the first mode of operation to the second mode of operation, said remote switching method comprising the steps of:

(a) forming in a source node, a command packet having a destination field that contains a destination address referencing a switchable node, where the formed command packet further has a frame data block containing N consecutive repetitions of a unique subsequence, where the unique subsequence corresponds to the destination address of the switchable node; and (b) transmitting the command packet by way of said transmission medium.

32. A remote switching method according to claim 31 wherein said device of the switchable node referenced by the destination field consumes a first amount of power when in the first mode of operation and said device consumes a greater, second amount of power when in the second mode of operation.

33. A mode controlling mechanism for use in switchable node of a data exchange system having a plurality of individual nodes coupled to one another through a transmission medium, wherein the switchable node includes a corresponding device which can be placed in a first mode of operation and thereafter switched to a second mode of operation, said mode controlling mechanism comprising:

(a) a receiver for receiving at said switchable node, one or more information packets each having a frame data block containing sequential data, where the sequential data has been transferred through said transmission medium, and where the received one or more information packets each includes a destination field containing a destination address referencing the switchable node;

(b) a frame data extractor for recovering the sequential data contained in the received one or more information packets;

(c) a mode determiner for determining if the device is in said first mode of operation;

(d) a sequence detector for determining whether a unique subsequence repeats at least N consecutive times within said recovered sequential data, where N is an integer greater than 1, and where the unique subsequence corresponds to the node-referencing destination address; and (e) an initiator for initiating a switching of said device to the second mode of operation in response to a finding by said mode determiner that the device is in said first mode of operation and in response to a finding by said sequence detector that there are N consecutive repetitions of said unique subsequence in said recovered sequential data.

34. A mode controlling mechanism according to claim 33 wherein said initiator includes a flip flop that sets in response to a finding by said sequence detector that there are N consecutive repetitions of said unique subsequence and resets in response to a finding by said mode determiner that the device is not in said first mode of operation.

35. A mode controlling mechanism according to claim 33 wherein said sequence detector includes a sequence counter that resets upon detection of a mismatch with said N consecutive repetitions of said unique subsequence in said recovered sequential data.

36. A mode controlling mechanism according to claim 33 wherein N is at least 16.

37. A mode controlling mechanism according to claim 36 wherein at least the sequence detector and initiator are contained within an integrated circuit.

38. A mode controlling mechanism according to claim 37 wherein the sequence detector includes a comparator, a subsequence-storing memory unit coupled to supply the subsequence to the comparator, and an address sequence coupled to the subsequence-storing memory unit for sequencing through data stored in the subsequence-storing memory unit.

39. A mode controlling mechanism according to claim 38 wherein said comparator, subsequence-storing memory unit, and address sequencer are further used to determine whether the received one or more information packets each includes a destination field containing a destination address referencing the switchable node.

* * * * *

UNITED STATES PATENT AND TRADEMARK OFFICE
CERTIFICATE OF CORRECTION

PATENT NO. : 6,049,885
DATED : April 11, 2000
INVENTOR(S) : Glen Gibson et al.

It is certified that error appears in the above-identified patent and that said Letters Patent is hereby corrected as shown below:

<u>Column 1</u>,
Lines 35-36, "Managed" should be --Central--; "Management" should be --Managed--.

Signed and Sealed this

Twenty-sixth Day of June, 2001

*Attest:*

NICHOLAS P. GODICI
*Attesting Officer*   *Acting Director of the United States Patent and Trademark Office*